United States Patent [19]
Taylor
[11] 3,765,014
[45] Oct. 9, 1973

[54] KEYBOARD

[75] Inventor: Frank E. Taylor, Danvers, Mass.
[73] Assignee: Syner-Data, Inc., Beverly, Mass.

[22] Filed: Oct. 12, 1970
[21] Appl. No.: 79,752

[52] U.S. Cl. .................. 340/365, 178/17 C
[51] Int. Cl. .................. G08c 9/04, G08c 19/28
[58] Field of Search .................. 340/365; 178/17 C

[56] References Cited

UNITED STATES PATENTS

| | | | |
|---|---|---|---|
| 2,814,031 | 11/1957 | Davis | 340/365 |
| 3,119,996 | 1/1964 | Comstock | 340/365 |
| 3,160,875 | 12/1964 | Bernard | 340/365 |
| 3,551,865 | 12/1970 | Frenkel | 340/365 |
| 3,573,369 | 4/1971 | Konig | 340/365 |

OTHER PUBLICATIONS

IBM Tech Disclosure Bull. Vol. 12 No. 4 Sept. 1969 page 612 " Electromagnetic Keyboard" R. N. Steckenrider

*Primary Examiner*—Thomas B. Habecker
*Attorney*—Robert L. Thompson, C. Yardley Chittick, Charles E. Pfund, Robert A. Townsend, Richard J. Birch, I. Stephen Samuels and Maurice E. Geuthier

[57] ABSTRACT

Keyboard for converting information to an electrical pulse code, comprising a base in which are mounted gapped magnetic core segments, primary and secondary wiring associated with the core segments and arranged to be magnetically coupled upon effective bridging of the core gaps and individual key modules corresponding to the core segments, each module having a housing independent of the base, a bar movable axially in and biased away from the core segments with respect to the housing, a key cap mounted at one end of the bar, and a magnetic core bridging member actuatable by the bar upon key depression to close the core gap.

15 Claims, 6 Drawing Figures

INVENTOR
FRANK E. TAYLOR
BY Jack Larsen
ATTORNEY

KEYBOARD

This invention relates to converting information to an electrical pulse code, through a keyboard, particularly a keyboard such as might be employed in a magnetic encoder as disclosed in U.S. Pat. No. 3,160,875 to David W. Bernard and of the general type disclosed in U.S. Pat. No. 2,814,031 to R.A. Davis.

A primary object of the invention is to provide an improved keyboard system with high code flexibility, which is easily adapted to a wide variety of applications (e.g., in which key spacing is easily changed without extra cost), and yet is extremely reliable, easily manufactured and maintained (e.g., being well sealed against dust), and relatively low in cost. Other objects are to reliably and simply prevent errors or ambiguities when two keys are simultaneously depressed, and to provide touch control without the elaborate hardware conventionally used for that function.

In general the invention features, in one aspect a keyboard base in which are mounted gapped magnetic core segments, primary and secondary wiring associated with the core segments and arranged to be magnetically coupled upon effective bridging of the core gaps and individual key modules corresponding to the core segments, each module having a housing independent of the base, a bar movable axially in and biased away from the core segments with respect to the housing, a key cap mounted at one end of the bar, and a magnetic core bridging member actuatable by the bar upon key depression to close the core gap. In another aspect the invention features key operated magnetic cores for coupling primary and secondary wiring in accordance with a code, a source of electronic pulses connected to the primary wiring, and a variable resistor connected between the pulse source and the primary wiring to control pulse strength, thereby determining the degree to which core bridging members must approach core segments to produce effective bridging, whereby the variable resistance acts as an electronic touch control for the keyboard. In yet another aspect the invention features logic elements connected to receive pulses originating in secondary wiring coupled to key actuatable magnetic cores, strobe circuitry coupled to cores and to the logic elements to disable the logic elements from responding to pulses originating in the secondary wiring except upon key depression sufficient to cause a strobe signal in the strobe circuitry, and lockout circuitry coupled to the cores and to the strobe circuitry to cause the strobe circuitry to continue to so disable the logic elements when more than one key is depressed. In preferred embodiments the key module housing comprises a pair of interlocking molded plastic members which can be separated for access to the module interior; the bridging member is fixed to the bar against resilient material in a molded plastic holder; the housing defines exterior wall surfaces for module-to-module and module-to-base sealing against contaminants; spongy sealing and wire-positioning blocks are provided between adjacent core segments and between the wiring and the modules; the modules are mounted in base channels, secured thereto through mating track-like portions of the modules and the channel walls, so that the modules are self-spacing along the channels, the base lacking fixed portions interposed between adjacent modules in a given row; and the source of electronic pulses provides pulses at a current level independent of the number of core segments effectively bridged, so that the lockout circuitry will receive a signal the voltage of which is dependent upon the number of core segments effectively bridged, the lockout circuitry receiving its signal through a diode having a breakdown voltage no less than the voltage level associated with effective bridging of a single core segment.

Other objects, features, and advantages will appear from the following description of a preferred embodiment of the invention taken together with the attached drawings in which.

Figure 3:
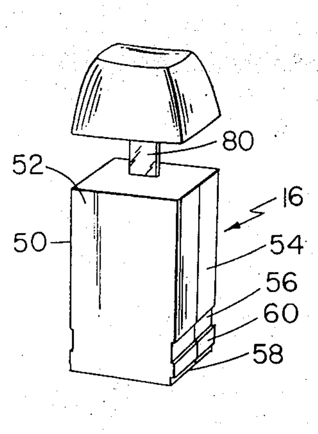
FIG. 3 is a perspective view of a key module.
Figure 4:
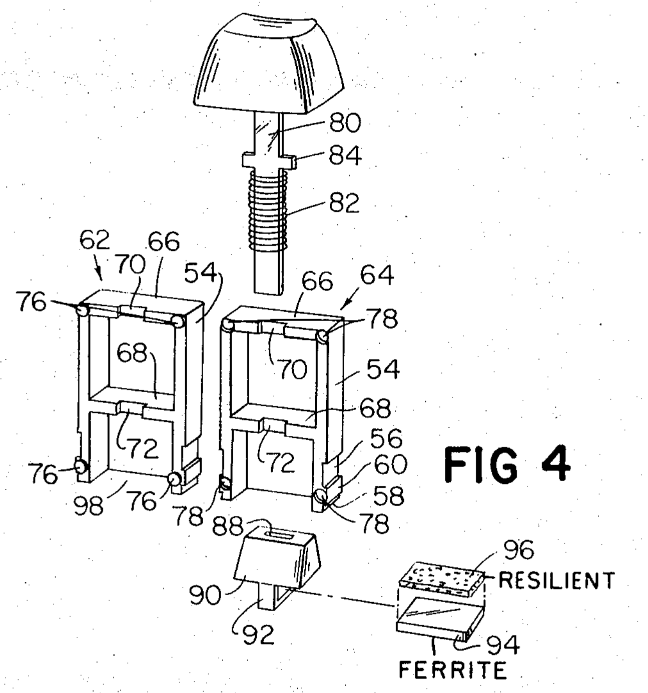
FIG. 4 is an exploded view of the module of FIG. 3.

Referring to the drawings, keyboard 10 has an extruded aluminum base 12 in parallel channels 14 of which are mounted rows of key modules 16.

Figures 1, 2:
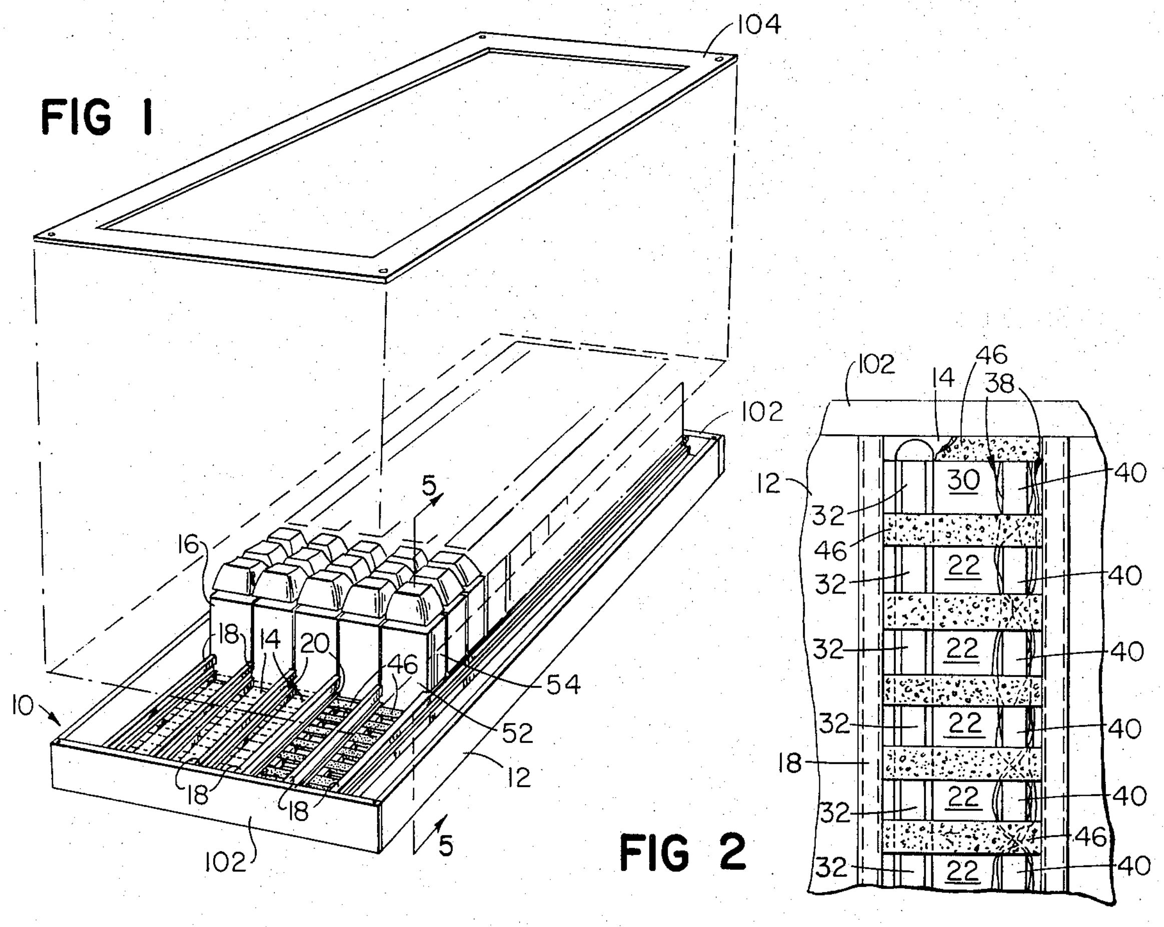
FIG. 1 is a partially exploded perspective view of a keyboard with some key modules removed to expose the base interior.
FIG. 2 is a fragmentary plan view in enlarged scale of one channel of the base interior.

Each channel 14 is defined between a pair of walls 18 (FIG. 5) along which run opposing parallel grooves 20. U-shaped ferrite core segments 22 are cemented in rows (FIG. 2) on the bottom surfaces 24 of the channels, one beneath each key module 16.

In each channel 14 a primary wire 30 (FIGS. 2, 5) of the coding circuitry runs inside all core segments 22 next to legs 32, returns along the outside of those legs, and continues to the remaining channels, to pass in series through all core segments of the keyboard, the leads being carried through base 12 to a circuit board mounted on its underside (not shown).

Individual secondary wires 38 run along legs 40 of core segments 22, without returning, the leads of each secondary wire being carried to the circuit boards through opposite ends of the base. The secondary wires thread inside and outside of the core segments in accordance with the desired binary code being employed, so that each core segment coupled to a given primary wire is coupled to a unique arrangement of secondary wires. A strobe wire 39 passes inside each segment 22.

Sponge polyurethane blocks 46 are located between adjacent core segments 22, on top of wires 30 and 38.

Figure 5:
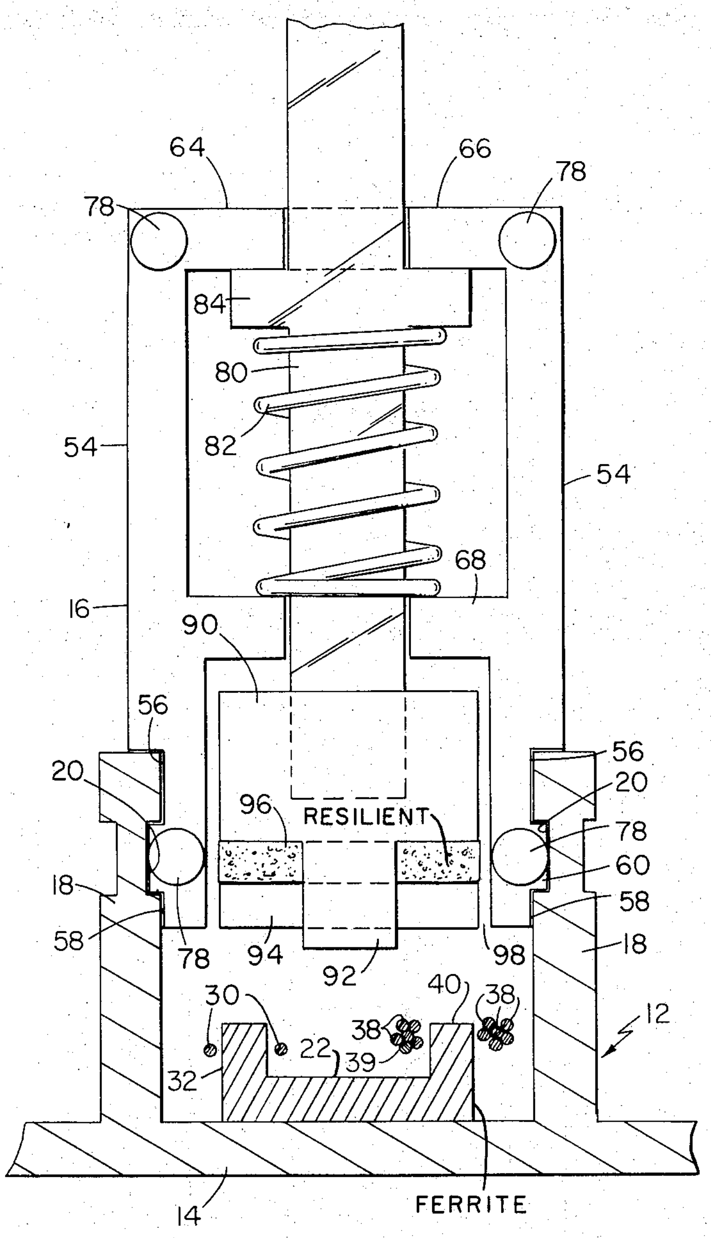
FIG. 5 is a sectional view taken along 5—5 of FIG. 1.

Each key module 16 has a two piece molded plastic housing 50 providing four walls 52, 54, flat except for recesses 56, 58 in walls 54 which define tongues 60 to mate with base grooves 20. Each half 62, 64 of housing 50 has a top wall 66 and a shelf 68, each notched at 70, 72. Projections 76 and recesses 78 cooperate to enable snapping the two halves together, bringing respective notches 70, 72 into opposition to form passages for metal bar 80. Coil spring 82 acts between T-stop 84 of bar 80 and shelves 68 to bias the bar upwardly. Key cap 86 is carried on the top of bar 80, and the bottom of the bar is press fitted into slot 88 of molded plastic holder 90, strap 92 of which surrounds ferrite strip 94. Sponge 96 is between strip 94 and the main body of holder 90. The holder and ferrite strip fit inside housing 50 at its open end 98 when bar 80 is in its upper position, as shown in FIG. 5.

The keyboard is assembled by locating core segments 22 in accordance with any desired key spacing (the self-spacing arrangement of the independent and wholly removable key modules providing this flexibility), and providing a plastic sheet (not shown) over the segments, sponge blocks, and wires in each channel. Key modules 16 are then slid into place, each above its respective core segment, and the plastic sheet is withdrawn. Spacers are placed at the channel ends to occupy any unused space, and end base plates 102 are screwed in place to hold the modules in position in the channels. Framing plate 104 is then secured to the base.

Excellent sealing against dust and other contaminants is provided by the contact of adjacent module housing walls 52 with each other, of walls 54 (including tongues 60) with the surfaces of walls 18, and of sponge blocks 46 with the bottom surfaces of housing 50 (these housings being wider than segments 22 and hence overlapping the sponge blocks which also serve to hold wires 30, 38 in place).

In operation, when a key is depressed, the associated ferrite strip 94 approaches and contacts legs 32 and 40 of core segment 22, completing the magnetic core and magnetically coupling with primary wire 30 those secondary wires 38 that are threaded inside that particular core. Electrical pulses passing through wire 30 thus induce pulses in those wires 38, providing a coded representation of the key depressed. Sponges 96 provide cushioning and pivotal freedom for strips 94.

Figure 6:
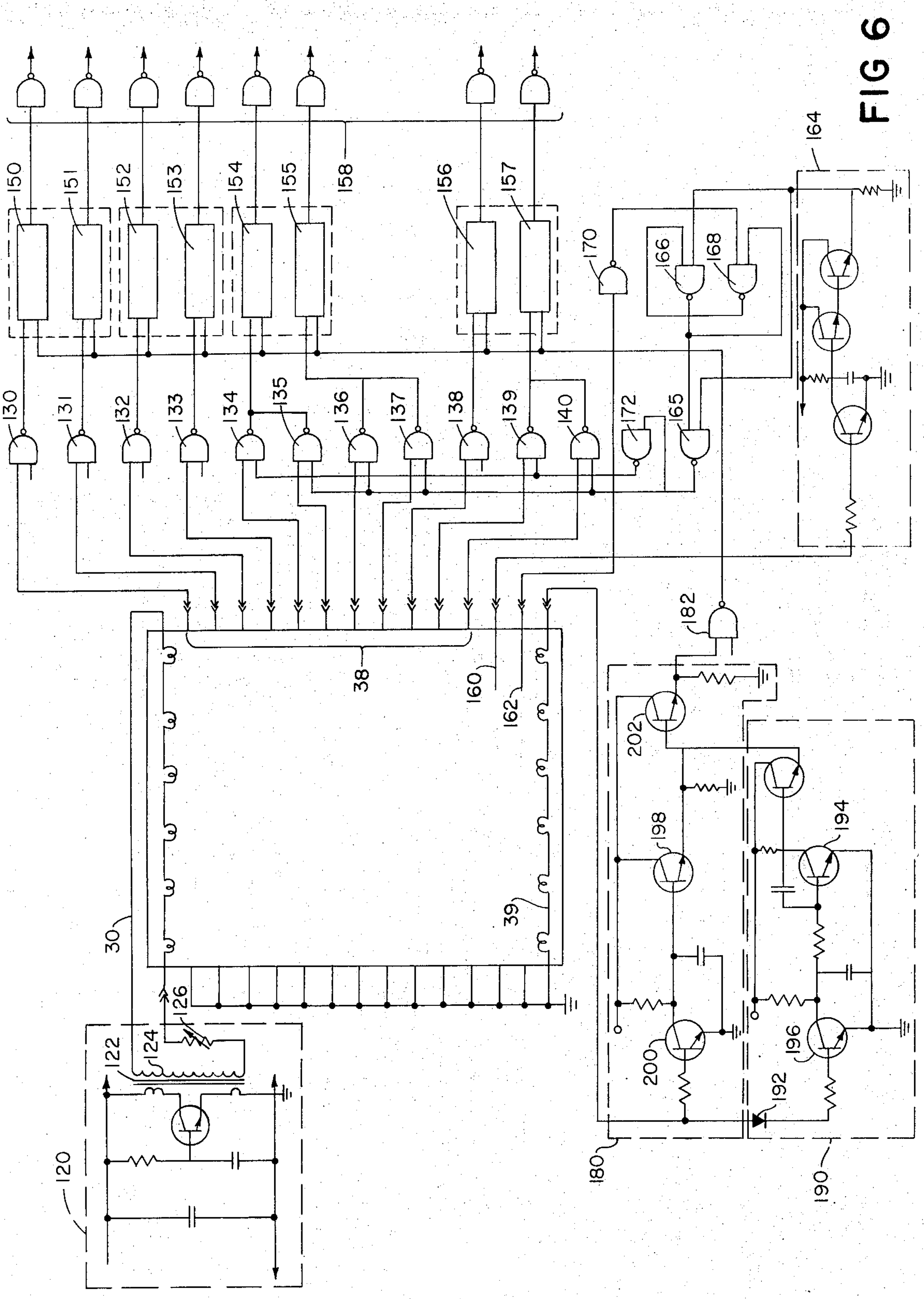
FIG. 6 is a schematic diagram of the electronic circuitry.

The electrical circuitry (FIG. 6) includes a blocking oscillator 120 with a flyback transformer 122, the secondary winding 124 of which is in series with primary wire 30 and variable resistor 126. This oscillator provides the electrical pulses on the primary wires, at a constant current (i.e., independent of the number of keys depressed, for a given setting of resistor 126) and at a voltage dependent upon the setting of resistor 126. The variable resistor thus provides a convenient electronic touch control, since the degree to which ferrite strips 84 must approach segments 22 to give the necessary magnetic coupling of the primary and secondary wires depends upon the strength of the primary pulses.

Secondary wires 38 are connected to gates 130–140 which in turn control storage register flip flops 150–7, the outputs of which act through buffer gates 158. Certain pairs of gates are wired for alternative control of a single flip flop (e.g., gates 134 and 135 are both wired to flip flop 154), the controlling gate being selected by a shift key operating electronically through shift wire 160 and by a shift lock key operating through shift lock wire 162.

Considering the shift and shift lock circuitry, wire 160 runs to a detector circuit 164 the output of which drives gate 165 and a flip flop composed of gates 166 and 168. Shift lock wire 162 drives gate 168 through gate 170. The output of gate 165 is connected directly to an input of one of each pair of shiftable gates, i.e., to gates 134, 136, and 140. Gate 172 inverts the output of gate 165 and is connected to the other of each pair of shiftable gates, i.e., gates 135, 137, and 139. With this circuitry, the shift and shift lock keys perform their usual keyboard functions.

Strobe wire 39 transmits a 0.7 volt pulse to detector circuit 180 whenever a single key is depressed, causing a logical one signal to pass from gate 182 to each of flip flops 150–7, enabling the flip flops to respond to signals from wires 38.

Lockout circuit 190 is also connected to strobe line 39, through diode 192 having a 0.7 volt breakdown voltage. Circuit 190 is essentially the same as circuit 180, except that transistor 194 responds to application of a signal to the base of transistor 196 with a signal inverse to that provided by transistor 198 in response to a signal at the base of transistor 200. The output of circuit 190 is fed to transistor 202 of circuit 180. Thus, if two keys are depressed, the strobe line will carry 1.4 volts (by virtue of the constant current in wire 30), activating circuit 190 and inverting the output of transistor 202 so that the strobe line is in effect disabled from activating flip flops 150–7. The moment the second key is released (as in roll over operation of the keyboard) diode 192 becomes non-conducting and code transmission occurs.

Other embodiments will occur to those skilled in the art and are within the following claims.

What is claimed is:

1. A keyboard for controlling electronic data transmission in accordance with a code, comprising
a base
a multiplicity of magnetic core segments, each of which is mounted in said base and contains a gap,
primary and secondary wiring associated with said core segments and arranged to be selectively magnetically coupled upon selective effective bridging of said gaps, and
a multiplicity of individual key modules mounted in said base respectively adjacent said core segments, each said module comprising
a housing independent of said base,
a bar movable axially in said housing and biased with respect to said housing away from said module's adjacent segment,
a key cap mounted at one end of said bar, and
a magnetic core bridging member actuatable by said bar upon depression of said key cap against said bias to bridge the gap of said module's adjacent segment,
and wherein said housing comprises a pair of interlocking molded plastic members which can be separated for access to the interior of said module.

2. A keyboard for controlling electronic data transmission in accordance with a code, comprising
a base
a multiplicity of magnetic core segments, each of which is mounted in said base and contains a gap,
primary and secondary wire means associated with said core segments and arranged to be selectively magnetically coupled upon selective effective bridging of said gaps,
a multiplicity of key operated magnetic core bridging members, each of which is selectively actuatable upon key depression to approach and effectively bridge one of said gaps,
an electronic current pulse source connected to all said primary wire means, and touch control means for determining the degree to which said bridging members must approach said core segments to produce said effective bridging, said touch control means being a resistor connected between said source and said primary wire means, and which is variable to control the strengths of pulses carried on said primary wire means.

3. The keyboard of claim 2 wherein said source of pulses comprises a blocking oscillator having a flyback transformer, said variable resistor being connected in series with the secondary coil of said transformer and in series with said primary wire means.

4. A keyboard for controlling electronic data transmission in accordance with a code, comprising a base a multiplicity of magnetic core segments, each of which is mounted in said base and contains a gap, primary and secondary wiring associated with said core segments and arranged to be selectively magnetically coupled upon selective effective bridging of said gaps, a multiplicity of key operated magnetic core bridging members, each of which is selectively actuatable upon key depression to effectively bridge one of said gaps, a source of electronic pulses connected to said primary wiring, a plurality of logic elements connected to receive pulses originating in said secondary wiring upon said effective bridging, strobe circuitry coupled to said core segments and to said logic elements to disable said logic elements from responding to said pulses originating in said secondary wiring except upon key depression sufficient to cause a strobe signal in said strobe circuitry, and lockout circuitry coupled to said core segments and to said strobe circuitry to cause said strobe circuitry to continue to so disable said logic elements when more than one said core segment is effectively bridged.

5. The keyboard of claim 4 wherein said source of electronic pulses provides pulses at a current level independent of the number of said core segments effectively bridged, and said lockout circuitry includes wiring coupled to each said core segment to receive a signal the voltage of which is dependent upon the number of said core segments effectively bridged.

6. The keyboard of claim 5 wherein said lockout circuitry is coupled to said core segments through a diode having a breakdown voltage no less than the voltage level induced in said wiring coupled to each said core segment upon effective bridging of a single said core segment.

7. A keyboard for controlling electronic data transmission in accordance with a code, comprising a base a multiplicity of magnetic core segments, each of which is mounted in said base and contains a gap, primary and secondary wiring associated with said core segments and arranged to be selectively magnetically coupled upon selective effective bridging of said gaps, and a multiplicity of individual key modules mounted in said base respectively adjacent said core segments, each said module comprising a housing independent of said base, a bar movable axially in said housing and biased with respect to said housing away from said module's adjacent segment, a key cap mounted at one end of said bar, a magnetic core bridging member fixed to said bar and actuatable upon depression of said key cap against said bias to bridge the gap of said module's adjacent segment, and a resilient pad located between said bar and said bridging member to provide said bridging member with pivotal freedom and cushioning when bridging said gap.

8. The keyboard of claim 7 including a molded plastic holder secured to said bar and in turn carrying said bridging member.

9. A keyboard for controlling electronic data transmission in accordance with a code, comprising a base a multiplicity of magnetic core segments, each of which is mounted in said base and contains a gap, primary and secondary wiring associated with said core segments and arranged to be selectively magnetically coupled upon selective effective bridging of said gaps, and a multiplicity of individual key modules mounted in said base respectively adjacent said core segments, each said module comprising a housing independent of said base, a bar movable axially in said housing and biased with respect to said housing away from said module's adjacent segment, a key cap mounted at one end of said bar, and a magnetic core bridging member actuatable by said bar upon depression of said key cap against said bias to bridge the gap of said adjacent segment, and wherein each said housing defines exterior wall surfaces, said surfaces of adjacent modules being in contact with each other to seal said segments against contaminants.

10. The keyboard of claim 9 wherein each said housing defines additional exterior wall surfaces which are in contact with portions of said base to provide additional sealing for said segments.

11. A keyboard for controlling electronic data transmission in accordance with a code, comprising a base a multiplicity of magnetic core segments, each of which is mounted in said base and contains a gap, primary and secondary wiring associated with said core segments and arranged to be selectively magnetically coupled upon selective effective bridging of said gaps, and a multiplicity of individual key modules mounted in said base respectively adjacent said core segments, each said module comprising a housing independent of said base, a bar movable axially in said housing and biased with respect to said housing away from said module's adjacent segment, a key cap mounted at one end of said bar, and a magnetic core bridging member actuatable by said bar upon depression of said key cap against said bias to bridge the gap of said module's adjacent segment, and said keyboard including sealing and wire-positioning blocks provided between adjacent ones of said core segments and between said wiring and said housings.

12. The keyboard of claim 11 wherein said blocks are of spongy material.

13. A keyboard for controlling electronic data transmission in accordance with a code, comprising a base a multiplicity of magnetic core segments, each of which is mounted in said base and contains a gap, primary and secondary wiring associated with said core segments and arranged to be selectively magnetically coupled upon selective effective bridging of said gaps, and a multiplicity of individual key modules mounted in said base respectively adjacent said core segments, each said module comprising a housing independent of said base, a bar movable axially in said housing and biased with respect to said housing away from said module's adjacent segment, a key cap mounted at one end of said bar, and a magnetic core bridging member actuatable by said bar upon depression of said key cup against said bias to bridge the gap of said module's adjacent segment, said key modules being arranged in rows of abutting modules so that said modules are self-spacing within said rows.

14. The keyboard of claim 13 wherein said base includes a multiplicity of parallel walls defining channels therebetween, said core segments being mounted at the bottoms of said channels, said parallel walls and said module housing having mating portions to secure each row of said modules in one of said channels.

15. The keyboard of claim 14 wherein said mating portions are tracklike, so that said modules can be positioned at any desired location along their respective channel.

* * * * *